Feb. 26, 1957  J. C. MOUZON  2,783,312
BINAURAL HEARING APPARATUS AND METHOD
Filed Aug. 6, 1952  3 Sheets-Sheet 1

INVENTOR.
JAMES C. MOUZON
BY
ATTORNEYS

Feb. 26, 1957  J. C. MOUZON  2,783,312
BINAURAL HEARING APPARATUS AND METHOD
Filed Aug. 6, 1952  3 Sheets-Sheet 2

INVENTOR.
JAMES C. MOUZON
BY
ATTORNEYS

Feb. 26, 1957  J. C. MOUZON  2,783,312
BINAURAL HEARING APPARATUS AND METHOD
Filed Aug. 6, 1952  3 Sheets-Sheet 3

INVENTOR.
JAMES C. MOUZON
BY
ATTORNEYS

United States Patent Office 2,783,312
Patented Feb. 26, 1957

2,783,312

BINAURAL HEARING APPARATUS AND METHOD

James C. Mouzon, Chevy Chase, Md.

Application August 6, 1952, Serial No. 303,016

5 Claims. (Cl. 179—107)

(Granted under Title 35, U. S. Code (1952), sec. 266)

The invention described herein may be manufactured and used by or for the Government for governmental purposes, without payment to me of any royalty thereon.

This invention relates to binaural sound reproduction and more particularly to a binaural apparatus and method to assist the human ear in locating and identifying a sound source.

A principal problem of the wearer of a hearing aid is the inability to select a particular sound source out of the combination of several sources of sound, or to locate the position of a single source of sound. This inability results in confusion and difficulty when the wearer is, for example, in a group of people all of whom are talking at once. Although a person having normal hearing can distinguish the direction as well as the particular source of sound, a person wearing a hearing aid does not have this ability. Accordingly, it is recognized that the ordinary hearing aid does not provide its user with as much information as is desirable and necessary in approaching an optimum level of hearing ability.

In normal binaural hearing, the location of a sound source and its identification depends to a large extent upon the detection of a phase or an amplitude difference between the sound reaching the two ears of the hearing aid wearer. Assuming that only one ear is functional or that it is impractical to wear two hearing aids, it is evident that binaural hearing is not practical with a single ear when it depends upon phase and amplitude difference alone.

Accordingly, it is a principal object of this invention to provide a method and apparatus of furnishing the human ear with additional information which is a function of position of sound source.

Another object of this invention is to provide a method and apparatus for assisting the human ear in locating and identifying a sound source through a single sound reproducer.

Another object of this invention is to provide binaural sound reproduction which is not dependent upon phase and amplitude differences alone.

A still further object of this invention is to provide a method and apparatus of binaural hearing which will approximate normal hearing ability and enable the user to identify the source of sound by its quality.

Briefly in accordance with this invention, there is provided a method and apparatus for receiving sound impulses at physically spaced locations and for resolving the received impulses from one location into a high frequency electrical component and from another location into a low frequency electrical component and then concurrently exciting a single sound reproducer with each of the resolved components of the received sound impulses. This is accomplished by physically spacing a pair of sound transducers within the area of reception and feeding the electrical outputs from each of the transducers into a high frequency selective channel and a low frequency selective channel respectively, and then combining the respective selective outputs of each channel and exciting a single sound reproducer with the combined output.

Figure 1:
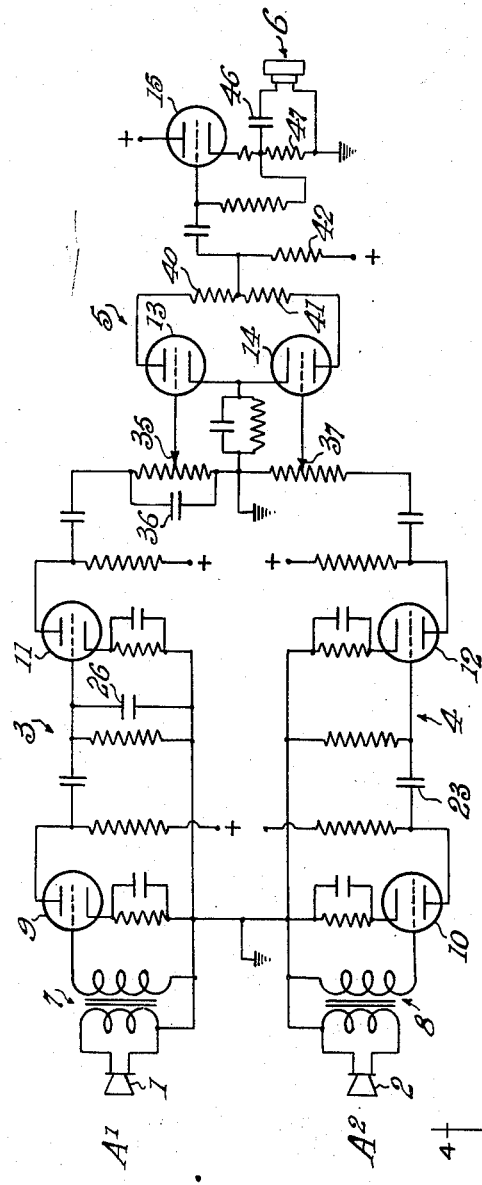
Fig. 1 is a schematic circuit representation of the preferred embodiment of applicant's binaural hearing aid.

Referring to Fig. 1, there is illustrated a schematic circuit diagram of the preferred embodiment of the binaural hearing aid of this invention, and represents substantially the electrical design of an exemplary model utilized in testing the principle of binaural hearing with a single ear phone wherein the quality of sound delivered to the ear is a function of the location of the sound source. The circuit of Fig. 1 comprises generally two frequency selective channels designated as A-1 and A-2 in the drawings. Each channel includes corresponding microphones 1 and 2 respectively which are physically spaced from each other. Microphones 1 and 2 could be of a frequency selective type as will be hereinafter more fully described in connection with Fig. 7 of the drawings. In the embodiment of Fig. 1, however, conventional microphones are shown electrically coupled to corresponding conventional amplifiers 3 and 4 respectively. The amplifiers 3 and 4 are identical with the exception of their frequency responses which are established by well known techniques of adjusting the coupling capacitors and resistors forming part of each circuit. Plate voltage is provided from a common supply through conventional decoupling filters. Each amplifier provides a frequency selective channel shown connected to a suitable mixer circuit 5 which, in the preferred embodiment illustrated, delivers a cathode follower output to a single sound reproducer or earphone 6. Those skilled in the electronic art will recognize the circuits of Fig. 1 as a straightforward method for accomplishing the desired results of frequency selection and mixing.

In the preferred embodiment illustrated in Fig. 1, the microphones 1 and 2 are coupled respectively through transformers 7 and 8 to the grid inputs of the first stages 9 and 10 respectively of the amplifiers 3 and 4. The first stages of each of these amplifiers are each resistance-capacitance coupled to second amplifier stages 11 and 12 respectively. The condenser 26 in channel A-1 serves to bypass the high frequencies and thereby allow only the low frequency components to reach the grid input of the stage 11 in the frequency selective channel A-1. In like manner, the capacitance 23 in frequency selective channel A-2 is so chosen as to offer high impedance to low frequencies, thus allowing only the high frequency components to reach the grid input of the stage 12 in frequency selective channel A-2. The plate voltage for each of the amplifier stages is obtained from a common supply through conventional decoupling filters, and the cathodes are connected through return circuits to ground. The outputs from stages 11 and 12 are respectively resistance-capacitance coupled through variable contacts 35 and 37 to the grid inputs of the vacuum tubes 13 and 14 respectively of the mixer circuit 5. A suitable by-pass condenser 36 is provided in the low frequency channel to assure only the low frequency components arriving at the mixer circuit from that channel. The anodes of tubes 13 and 14 are respectively connected through resistances 40 and 41 and interconnected through a common output resistance 42. The common output then is resistance-capacitance coupled to the grid input of the output amplifier 15. The amplifier 15 provides a cathode-follower output across the cathode resistance 47 which is coupled through a suitable condenser 46 to the earphone 6.

Figure 2:
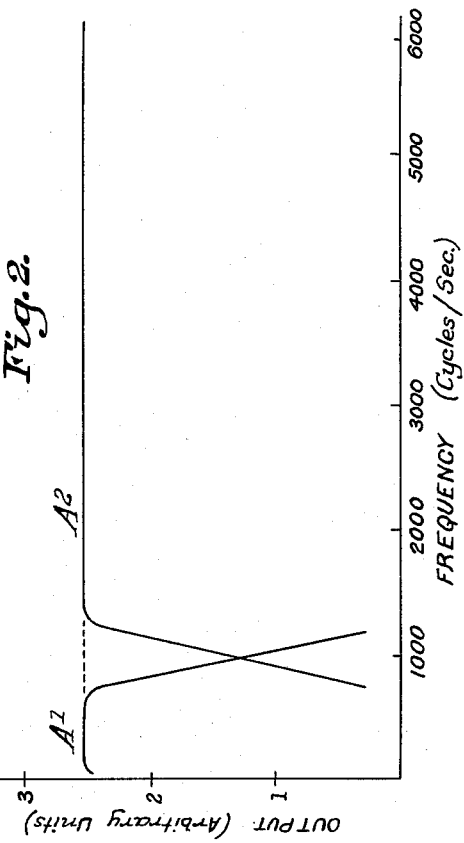
Fig. 2 illustrates the preferred type of frequency response of the amplifiers illustrated in Fig. 1.

Referring now to Fig. 2, the response charactertistics of the apparatus of Fig. 1 are idealized for clarity of description and represent the optimum characteristics desired. Thus, amplifier 3 may be designed to pass low frequencies up to 1000 C. P. S. and amplifier 4 may be designed to pass high frequencies above 1000 C. P. S. with a substantially uniform response over the desired ranges.

Figure 3:
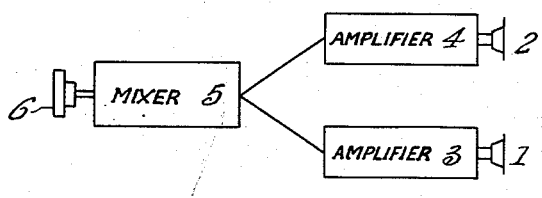
Fig. 3 is a diagrammatic illustration of applicant's apparatus spaced from a plurality of differently located sources of sound.
Figure 3:
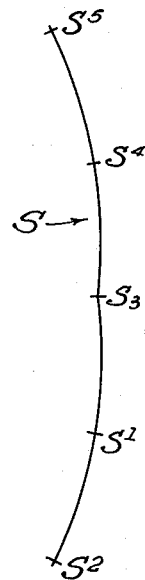
Figure 4:
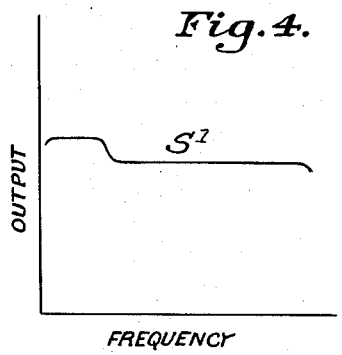
Fig. 4 is a graphical representation of the overall frequency response curves corresponding to the multiple sound source positions of Fig. 3.
Figure 4:
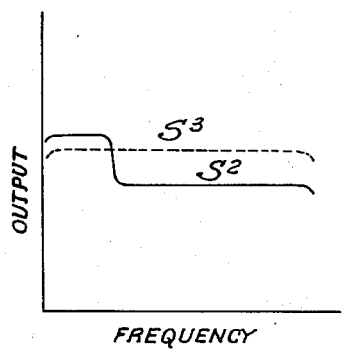
Figure 4:
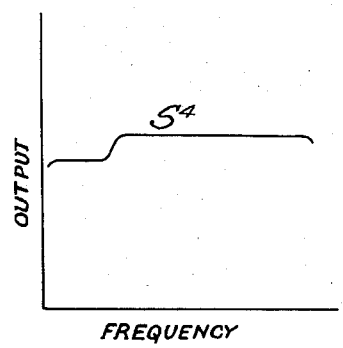
Figure 4:
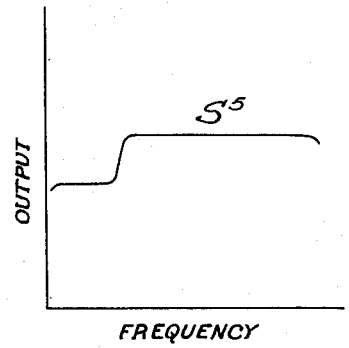

Fig. 3 diagrammatically illustrates the phyical arrangement of the apparatus of Fig. 1 located a suitable distance from a sound source designated at "S." If the sound source is placed in different spaced positions as indicated, at S-1, S-2, S-3, S-4 and S-5 in Fig. 3, the energy frequency relationship of the sound reaching the ear through the earphone 6 will be as shown in Fig. 4. Thus, when the source of sound is in positions S-1 and S-2, the ear will hear the low frequencies accentuated, while the high frequencies are accentuated when the sound is at positions S-4 and S-5. In position S-3 the sound will appear normal to the ear. A listener can be educated to recognize the difference in the apparent quality of sounds. Qualitative tests have been run on the equipment illustrated in Fig. 1 which have demonstrated the feasibility of the apparatus. Of course, the precision with which a sound source might be located an identified would increase with the experience of the user.

In operation, sound comprised of a wide range of audio frequencies impinges on the microphones 1 and 2. The origin of such sound may be an orchestra, the human voice, or any other source of complex sound in which the listener may be interested. Amplifier 3 in frequency selective channel A-1 is so designed as to pass only the low frequency components of the sound, and to discriminate against the high frequency components. Likewise, amplifier 4 of frequency selective channel A-2 is designed so that it will pass only the high frequency components of the sound and will discriminate against the low frequency components. Thus, in Fig. 3 if the source of sound is to the right of an imaginary line midway between microphones 1 and 2, the output from amplifier 3 will be relatively greater than the output from amplifier 4 and accordingly the low frequency components of the sound will be relatively more intense at the output of amplifier 3 than will be the high frequency components at the output of amplifier 4. Conversely, the output of amplifier 4 will be relatively greater than the output of amplifier 3 when the source of sound is to the left of an imaginary line midway between the microphones 1 and 2 and the high frequency components at the output of amplifier 4 are relatively stronger in this case than the low frequency components at the output of amplifier 3.

In view of the foregoing, it is clear that the outputs from amplifiers 3 and 4 contain discreet information which is dependent on the position of the source of sound. This information must be translated to a form which can be resolved and understood by the human brain, and to approximate normal hearing ability, it is deemed advisable to translate such information into a form that can be transmitted to the human brain through a single portal, namely, through a single ear or single bone conduction unit on the head. To accomplish this translation and transmission, there is provided in effect an auxiliary electronic brain in the form of the mixer circuit 5 which will combine the outputs from the amplifiers 3 and 4 in such a manner as to perform the translation of information contained therein into a langauge which the human brain can understand and utilize in accordance with the desired objectives. The combined output of the mixer 5 is fed through a cathode-follower into an earphone or bone conduction unit designated as 6. This sound reproducing unit 6 contains the discreet information which permits the human brain to determine the direction from which a source of complex sound impulses is emanating relative to the microphones 1 and 2. If the source of the sound is to the right of an imaginary line midway between microphones 1 and 2 the human brain finds low frequencies to be accentuated relative to the high frequencies. Conversely, if the sound source is to the left of an imaginary line midway between microphones 1 and 2, the brain finds high frequency components of the sound accentuated relative to the low frequency components.

To further illustrate the principle of operation of the hearing aid of this invention, assume that the amplifier 3 is responsive only to low frequencies from 80 to 2000 cycles per second and is fed from microphone 1. Likewise assume that the amplifier 4 is responsive only to high frequencies from 2000 to 4000 cycles per second and is fed from microphone 2 and the outputs from both amplifiers are mixed in mixer 5 and fed to the single earphone 6. Thus, if microphone 1 is worn on one side and microphone 2 is worn on the other side of a human body, the frequency energy relationship associated with sound from a given source would appear to vary to the wearer of the earphone depending on the relative position of the source of the microphones 1 and 2. If a source emitted sound whose intensity was constant from 80 to 4000 cycles per second, the earphone would recognize this fact only if the source were equidistant from microphones 1 and 2. If the source of sound were nearer to microphone 1, or if reflections from surroundings made the intensity of the sound greater in 1 than in 2, the low frequencies would be accentuated. If, on the other hand, the source of sound were nearer to microphone 2 than to 1 the high frequencies would be accentuated. Thus, it is possible for the wearer to determine when the source of sound moves from one place to another by the quality of sound received from the microphone due to the change in relative distances from the source to the microphones 1 and 2 respectively. An experienced wearer of the binaural hearing aid of this invention could learn the quality of the voice of a given person and thereby enable himself to concentrate his attention on that particular assortment of frequencies, fundamental and harmonics, associated with a given person's voice to eliminate a principal difficulty which limits the hearing ability of hearing aid users.

The binaural hearing aid of this invention can be further refined to facilitate the discrimination of one sound in preference to another by adding a tone control arrangement which would allow an appreciable variation in the frequency response so that the hearing aid wearer could adjust the frequency response of the selective channels A-1 and A-2 to fit a single speaker in a group and thereby enable the wearer to concentrate his attention on the single speaker in preference to other background complex noises. The refinement with a tone control is preferable to the adjustment of volume in accomplishing the type of discrimination that is compatible with the sensitive hearing mechanism of the human ear and brain. Thus, Figs. 5 and 6 illustrate two circuit arrangements, either of which may be used as a satisfactory tone control in a hearing aid to permit the wearer to tune the hearing aid to the voice of a particular speaker.

Figure 5:
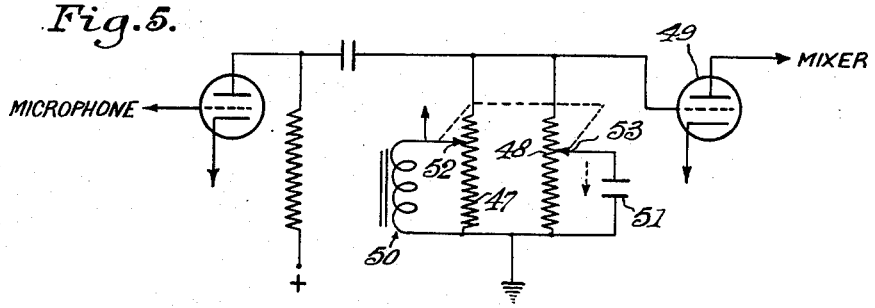
Fig. 5 is a schematic circuit arrangement of a tone control which might be used in a conventional amplifier to replace dual channel amplifiers 3 and 4 of Fig. 1.

Referring to Fig. 5, there is shown a tone control circuit with two controls in the audio-amplifiers but ganged into a common control. In operation, the resistors 47 and 48 form a parallel grid resistor for one of the vacuum tubes 49 in the amplifier which for purposes of illustration may be the second amplifier stage. A choke 50 is connected between the sliding contact of the resistor 47 and ground, while a capacitor 51 is connected between the sliding contact of the resistor 48 and ground. The two sliding contacts 52 and 53 are so linked together mechanically that in one extreme position the choke completely shunts the resistor 47 while condenser 51 is short circuited at the bottom of resistor 48. In this position the high frequency components of the sound are accentuated by virtue of the fact that the choke 50 offers a high impedance to the high frequencies and a low impedance to the low frequency components. In the other extreme position of the tone control, the capacitor 51 is connected across all of the resistance 48 while the choke 50 is short circuited at the bottom end of the resistor 47. In this case, the high frequency component of sound is by-passed by the capacitor 51 and the low frequency component appears to be accentuated. With proper choice of the components, the amplifier response characteristics may be varied continuously so as to peak at any given frequency in the audible range. The components may thus be chosen so as to aid the wearer of the hearing aid to tune the amplifier to the voice of a given speaker and thus partially discriminate against the voices of others. This scheme is effective, for example, in permitting the hearing aid wearer to select one voice out of a group and thus reduce the normal confusion experienced in a group of people.

Figure 6:
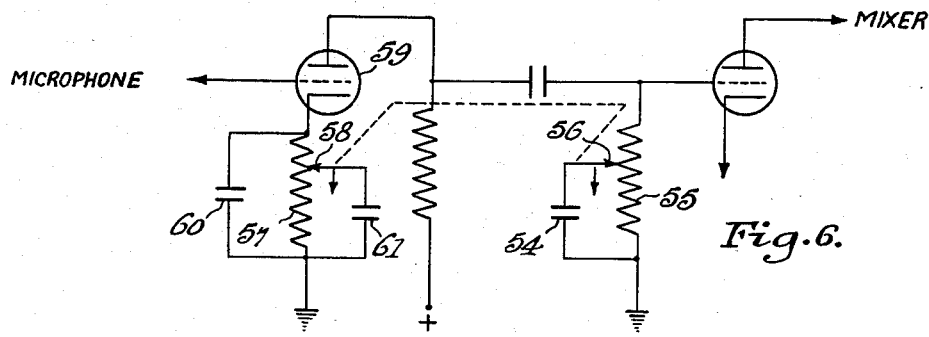
Fig. 6 is another embodiment of the tone control of Fig. 5.

Referring to the circuit of Fig. 6 which accomplishes the same purpose as that of Fig. 5, the accentuation of the low frequencies is accomplished as in Fig. 5 by shunting the high frequencies with the condenser 54 in the grid circuit of the second stage. The degree of shunting is determined by the position of the sliding contact 56 of the grid resistor 55 which is ganged to the sliding contact 58 of the resistor 57. In addition, the low frequency response is controlled by adjusting the gain of the first amplifying stage. A distinction of the circuit of Fig. 6 from that illustrated in Fig. 5 is in the control of the attenuation of the low frequency components resulting in accentuation of the high frequency components. This is accomplished by varying the degeneration of the low frequencies in the cathode circuit of the first tube 59 shown in Fig. 6. The cathode resistor 57 is shunted permanently with the capacitor 60, which is so chosen as to give the tube normal gain at high frequencies. The gain of the tube at low frequencies is determined by the position of the sliding contact on the resistor 57. The capacitor 61 is chosen so as to give the tube the desired low frequency gain when the resistor slider is at the upper end of the resistor 57. The sliders of the two resistors 55 and 57 are ganged in such a manner as to permit varying the response characteristics continuously with one control. Thus, the circuit illustrated in Fig. 6 accomplishes the same function and result as that illustrated in Fig. 5 without resorting to the use of a choke coil.

Figure 7:
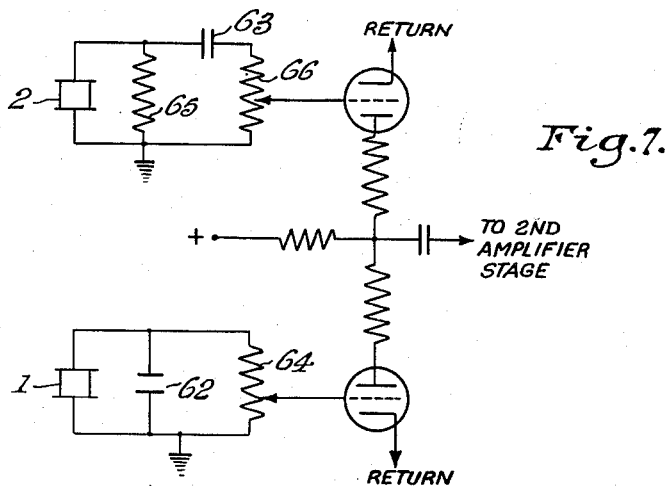
Fig. 7 is a circuit arrangement for controlling the frequency characteristics of the microphones of Fig. 1.

As previously suggested, binaural hearing in accordance with this invention may also be accomplished by using two frequency selective microphones feeding into an essentially standard hearing aid amplifier as shown in Fig. 7 and a single earphone. In this way, the embodiment illustrated in Fig. 1 could be reduced to a hearing aid similar in size to the conventional type hearing aid with the addition of one microphone.

The microphones may be any type of frequency selective microphone. Frequency selective microphones of this type are well known in the art and the frequency selection is accomplished by controlling the frequency characteristics of the microphones mechanically or electrically. If conventional crystal microphones of good frequency characteristics are used, electrical circuits may be provided for making one microphone effectively a low pass frequency microphone and the other a high pass frequency microphone.

Suitable electrical circuits to accomplish these purposes are shown in Fig. 7 where the outputs of the microphones 1 and 2 are filtered and are mixed in the first stage of the amplifier. A preferred type of mixer circuit is shown, although a number of other type mixer circuits such as one using a multiple grid tube would be satisfactory. The filter circuits shown connected to the respective microphones function so that the capacitor in each filter network by-passes respectively the high frequencies or the low frequencies. Thus, the combination of the microphone 1 and the capacitor 62 produces a low pass microphone and the capacitor 63 in the other filter circuit is so chosen as to offer high impedance to low frequencies, thus producing in combination with a microphone 2 a high pass microphone. The values of the capacitors 62 and 63 with the associated resistances 64, 65 and 66 respectively are chosen to produce the desired low and high pass characteristics in accordance with standard practice.

The ultimate use of the binaural hearing aid and method of this invention requires that the associated circuits and elements be suited to the particular ear in question so that the utilization of the frequency discriminating characteristics of that ear will provide optimum sound localization and identification for an individual with only one ear phone. The concept of binaural sound reproduction embodied in this invention may be readily adapted to meet any sound location and identification requirements and, in this respect, may be of significant military interest. The circuits illustrated in the drawings utilize low and high pass frequency channels designed to provide a reasonable response characteristic to accommodate the particular ear. Other refinements and modifications of the circuits in accordance with conventional practice may be accomplished to provide a single cross over frequency such that the hearing aid can be universally applicable to all types of individuals. Recognition, however, must be given to the fact that the frequency response of deaf persons is frequently impaired and abnormal and that the response of different ears varies. Accordingly, special attention must be given to the cross over point of the high and low pass filter circuits for such hearing aid to be universally satisfactory. Suitable adjustments can be provided to achieve optimum performance for a specific individual.

It is a widespread practice among individuals having abnormal (that is, impaired) hearing to employ so-called "hearing aids" which usually are electrical or electronically actuated devices which are designed to intensify sound waves emanating from a source of sound and to render the resulting sounds clearly audible to the hearer. The effectiveness and efficiency of standard commercial hearing aids have shown steady improvement as improvements in knowledge and understanding of sound-detecting and reproduction technologies have advanced, coupled with the impetus of active competition. However, wearers of conventional commercial hearing aids are still presented with the practical difficulty and problem of being enabled to locate and to select the source of a particular sound, where a multiplicity of sounds is emanating simultaneously from several sources of sound, or to locate the position of a single source of sound, or the direction thereof, relative to the hearer. This difficulty is a highly practical one, and results frequently in confusion, embarrassment, and difficulty to the listener in many circumstances, such as for example, where the wearer of such an aid finds himself among a group of individuals all of whom may be talking at once. Although an individual with normal hearing usually can distinguish both the direction and particular source of sound, a wearer of a hearing aid of a conventional type frequently does not possess such capability. Accordingly, it is recognized that the usual commercial types of hearing aids do not provide their wearers with as much information as may be needed or desirable in approaching optimum levels of hearing ability.

Test results have shown that a person of normal hearing could obtain sound localization to one ear with a cross over frequency of about one thousand cycles per second. For a deaf person whose high frequency response is particularly poor, such tests have shown that the cross over frequency should be somewhat lower. The significance of the selection of the proper cross over frequency in the adaptation of this device and method, indicates the importance of the particular circuits illustrated and described herein.

Having thus described my invention, what I claim as new and wish to secure by Letters Patent is:

1. A binaural hearing aid comprising in combination a pair of physically spaced microphones, a pair of plural stage amplifiers, each including a plurality of plural electrode electron discharge devices, each of said devices having a grid-controlled input, a cathode and an anode respectively, a source of direct-current potential connected at one side to each anode, a transformer coupling each of said microphones to the grid-input of a first discharge device in a different amplifier respectively, means including a high-pass resistance-capacitance coupling between the anode of the first discharge device in one amplifier and the grid input of a second discharge device in said amplifier, other means including a low-pass resistance-capacity coupling between the anode of the first discharge device of the other amplifier and the grid-input of a second discharge device in said amplifier, circuit return means connecting the cathodes of each of said devices to the other side of said source of potential, an electronic mixing circuit including another pair of electron discharge devices each having a cathode, an anode, and a grid-controlled input, means connecting said cathodes to said other side of said source of potential, a resistance-capacitance coupling between the respective anodes of the second discharge device of each amplifier and a different one of the grid-controlled inputs of said other pair of discharge devices, means connecting the anodes of said other pair of discharge devices together through a common resistance to said one side of said source of potential, an output circuit including an electron discharge device having a grid-controlled input with a resistance-capacitance coupling to said common anode resistance, said output discharge device having a cathode-follower output, an earphone, and means coupling said earphone to said cathode-follower output.

2. A binaural sound locator apparatus comprising a plurality of sound transducers, mounting means for said plurality of sound transducers, said sound transducers disposed on said mounting means in a regular predetermined pattern relative to a center line of said mounting means limiting the environment for the reception of sonic energy effective to actuate each of said sound transducers to a zone directly forward of each of said sound transducers, a plurality of frequency selective amplifiers, a first one of said plurality of sound transducers electrically connected to one of said plurality of frequency selective amplifiers including a high frequency selective filter for passing frequencies detected by said first one of said plurality of sound transducers above a predetermined frequency, a second one of said plurality of sound transducers electrically connected to a low frequency selective filter for passing frequencies detected by said second one of said plurality of sound transducers below a predetermined frequency, sound reproducing means, electronic means connected to the outputs of said frequency selective amplifiers for combining such outputs and accentuating frequencies determined by the relative energy of sonic vibrations received by said first and second transducers and passed by said high and low frequency filters, respectively, means connected to said electronic means and said sound reproducing means for amplifying such accentuated frequencies to produce audible signals whereby the frequency of sound accentuated by said sound reproducing means is a function of the location of the sound source.

3. Apparatus as recited in claim 2 wherein said high frequency filter includes a pair of resistors connected in shunt relation with each other through a capacitor, said first transducer connected in parallel with said high frequency filter, said low frequency filter includes a parallel capacitor and resistor arrangement connected in parallel with said second transducer.

4. A binaural sound locator apparatus comprising a pair of sound transducers and means for mounting said transducers in symmetrical, mutually spaced arrangement about a center line of said mounting means, said sound transducers being connected respectively to high and low frequency selective amplifiers, a grid-controlled electron discharge device included in each of said amplifiers, frequency control means in each of said high and low frequency channels including a linear impedance shunting the input to each said discharge device, an inductive impedance and a capacitative impedance respectively shunting each said linear impedance through different adjustable electrical contacts, and control means common to each of said contacts for concurrently adjusting one of said contacts towards increasing shunt relation, and the other contact towards decreasing shunt relation to each said linear impedance, said pair of sound transducers directed respectively toward forwardly divergent environments on opposite sides of said mounting means center line, a first of said pair of sound transducers being responsive to sonic energy originating in one forwardly divergent environment said high frequency amplifier frequency control cooperating to pass frequencies detected by said first transducer above a predetermined frequency, a second transducer directed toward an opposite forwardly divergent environment relative to said first transducer, said second transducer being responsive to sonic energy originating in such latter environment, said low frequency amplifier frequency control cooperating to pass frequencies detected by said second transducer below a predetermined frequency, electronic means for combining the outputs of said frequency selective amplifiers and accentuating frequencies determined by the relative energy of sonic vibrations received by said first and second transducers and passed by said high and low frequency control means respectively, a sound reproducer, means for connecting said sound reproducer to said high and low frequency amplifiers and amplifying such accentuated frequencies to produce audible signals in said sound reproducer whereby the frequency of sound accentuated by said sound reproducer is a function of the location of the sound source.

5. A binaural sound locator apparatus comprising a pair of sound transducers and means for mounting said transducers in symmetrical, mutually spaced arrangement about a center line of said mounting means, said transducers being connected respectively to high and low frequency selective amplifiers, frequency control means in each of said amplifiers including a pair of electrically coupled grid-controlled electron discharge devices, a first one of said pair of discharge devices having a cathode return circuit including a resistance and capacitor in shunt relation with each other, a second capacitor connected across said resistance through an adjustable electrical contact, a second resistance shunting the input to a second one of said pair of discharge devices, a third capacitor connected across said second resistance through another adjustable electrical contact, and common mechanical control means for concurrently adjusting said contacts towards increasing and decreasing shunt relation to the corresponding resistance, said pair of sound transducers directed respectively toward forwardly divergent environments on opposite sides of said mounting means center line, a first of said pair of sound transducers being responsive to sonic energy originating in one forwardly divergent environment, said high frequency amplifier frequency control means cooperating to pass frequencies detected by said first transducer above a predetermined frequency, a second transducer directed toward an opposite forwardly divergent environment relative to said first transducer, said second transducer being responsive to sonic energy originating in such latter environment, said low frequency amplifier frequency control means cooperating to pass frequencies detected by said second transducer below a predetermined frequency, electronic means for combining the outputs of said frequency selective amplifiers and accentuating frequencies determined by the relative energy of sonic vibrations received by said first and second sound transducers and passed by said high and low frequency control means, respectively, a sound reproducer, means for connecting said sound reproducer to said high and low frequency amplifiers and amplifying such accentuated frequencies to produce audible signals in said sound reproducer whereby the frequency of sound accentuated by said sound reproducer is a function of the location of the sound source.

References Cited in the file of this patent

UNITED STATES PATENTS

| | | |
|---|---|---|
| 2,256,057 | Roberts | Sept. 16, 1941 |
| 2,352,696 | De Boer et al. | July 4, 1944 |
| 2,373,560 | Hanert | Apr. 10, 1945 |
| 2,378,383 | Arndt | June 19, 1945 |
| 2,536,664 | Sinnett et al. | Jan. 2, 1951 |
| 2,556,889 | Sterner | June 12, 1951 |

FOREIGN PATENTS

| | | |
|---|---|---|
| 456,001 | Germany | Feb. 15, 1928 |